(12) United States Patent
Jensen

(10) Patent No.: US 10,590,910 B2
(45) Date of Patent: Mar. 17, 2020

(54) WIND TURBINE AND A WIND TURBINE BLADE

(71) Applicant: Bladena ApS, Ringsted (DK)

(72) Inventor: Find Mølholt Jensen, Viby Sjælland (DK)

(73) Assignee: BLADENA ApS, Ringsted (DK)

( * ) Notice: Subject to any disclaimer, the term of this patent is extended or adjusted under 35 U.S.C. 154(b) by 87 days.

(21) Appl. No.: 15/575,112

(22) PCT Filed: May 20, 2016

(86) PCT No.: PCT/DK2016/050137
§ 371 (c)(1),
(2) Date: Nov. 17, 2017

(87) PCT Pub. No.: WO2016/184475
PCT Pub. Date: Nov. 24, 2016

(65) Prior Publication Data
US 2018/0156191 A1 Jun. 7, 2018

(30) Foreign Application Priority Data

May 20, 2015 (DK) .................................. 2015 70298
Oct. 23, 2015 (DK) .................................. 2015 70689

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05); *F05B 2230/60* (2013.01);
(Continued)

(58) Field of Classification Search
CPC .... F03D 1/0675; F03D 1/0683; F03D 1/0633; F03D 1/0641; F16B 5/0275
(Continued)

(56) References Cited

U.S. PATENT DOCUMENTS

| 4,373,309 | A | * | 2/1983 | Lutz | ...................... | E04F 11/035 |
| | | | | | | 403/168 |
| 5,304,023 | A | * | 4/1994 | Toback | ................. | F16B 33/004 |
| | | | | | | 411/387.3 |

(Continued)

FOREIGN PATENT DOCUMENTS

| CN | 102076957 A | 5/2011 |
| EP | 1 884 623 A2 | 2/2008 |

(Continued)

OTHER PUBLICATIONS

Chinese Office action dated Jan. 18, 2019 for related Chinese application No. 201680029179.0.

*Primary Examiner* — Richard A Edgar
(74) *Attorney, Agent, or Firm* — Lee IP Law, P.C.

(57) ABSTRACT

A wind turbine blade, comprising: a shell with an aerodynamic profile with at least one reinforcing rod having a largest cross section between the first and the second end of the rod and extending in the internal space with its longitudinal direction between the suction side and the pressure side. The shell has a first through hole having a smallest cross section being larger than the largest cross section of the rod. The rod has a first head having a cross section larger than the smallest cross section of the first through hole and is attached to the outer surface of the shell and where the second end of the rod is attached to a second through hole in the shell by a screw having a second head resting against the outer surface of the shell, and a shank extending through the second through hole in the shell.

6 Claims, 2 Drawing Sheets

Figure 1:
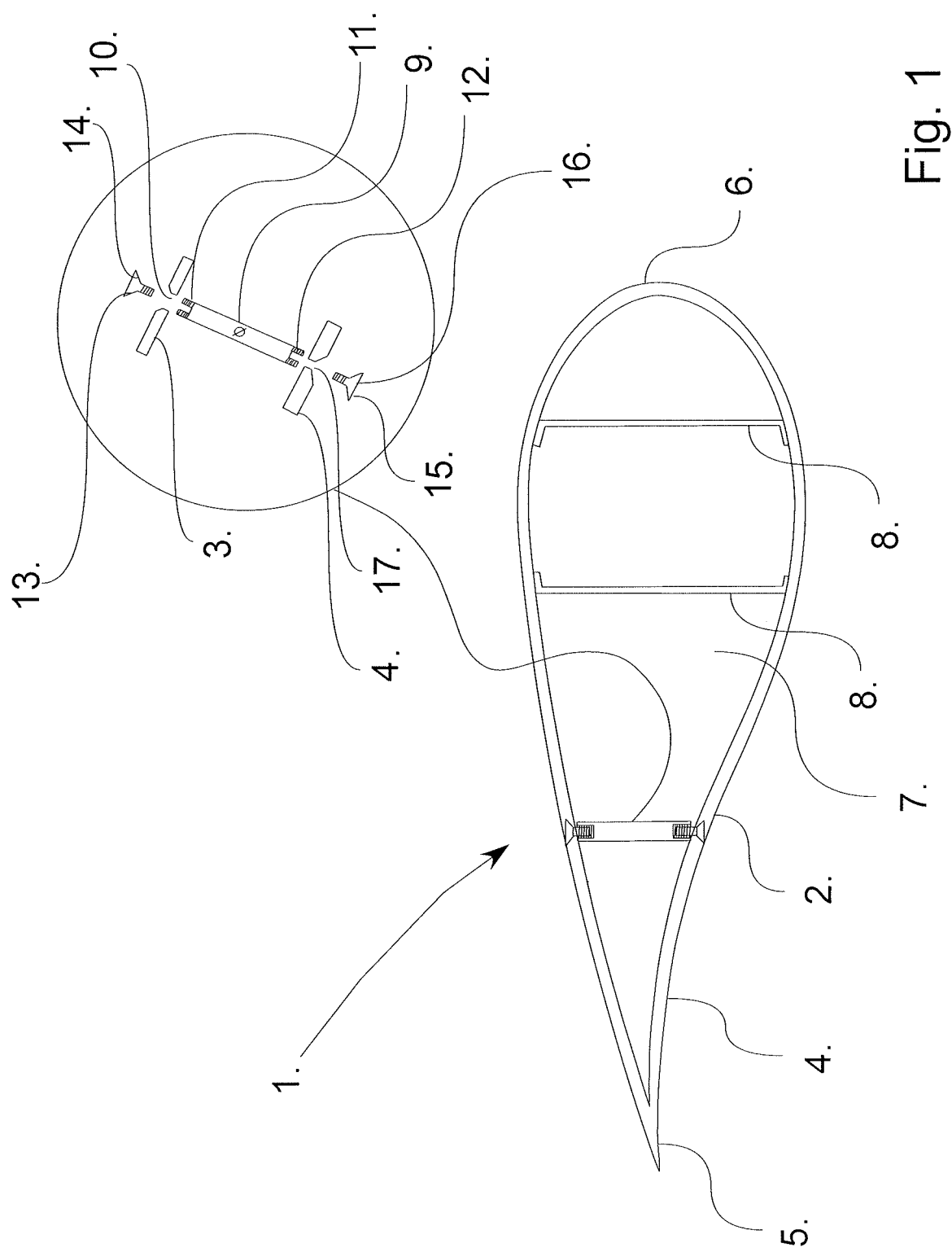

(52) U.S. Cl.
CPC ... *F05B 2240/301* (2013.01); *F05B 2260/301* (2013.01); *Y02E 10/721* (2013.01); *Y02P 70/523* (2015.11)

(58) Field of Classification Search
USPC .......................................................... 411/389
See application file for complete search history.

(56) References Cited

U.S. PATENT DOCUMENTS

| | | | |
|---|---|---|---|
| 8,807,953 B2 * | 8/2014 | Jensen | F03D 1/0675 416/226 |
| 2011/0209347 A1 | 9/2011 | Deak et al. | |
| 2011/0243736 A1 * | 10/2011 | Bell | F03D 1/0675 416/132 R |

FOREIGN PATENT DOCUMENTS

| | | |
|---|---|---|
| EP | 2 108 083 | 10/2009 |
| EP | 2 304 228 | 4/2011 |
| EP | 2 649 690 B1 | 3/2016 |
| JP | S61 192866 A | 8/1986 |
| WO | WO 2009/155920 A1 | 12/2009 |

* cited by examiner

WIND TURBINE AND A WIND TURBINE BLADE

CROSS REFERENCE TO RELATED APPLICATIONS

This is the U.S. national phase application based on PCT Application No. PCT/DK2016/050137 filed May 20, 2016, which is based on Denmark Patent Application No. DK201570298, filed May 20, 2015, and Denmark Patent Application No DK201570689 filed Oct. 23, 2015, the entire contents of all of which is hereby incorporated by reference.

THE PRIOR ART

The present invention relates to a wind turbine, and especially to a wind turbine blade, comprising a shell with an aerodynamic profile forming a suction side and a pressure side of the blade, the suction side and the pressure side being separated by a leading edge and a trailing edge defined by the direction by which the blade moves through space during normal operation, and a number of elongated reinforcing members connected to the shell for increasing the strength of the blade, each of the at least one elongated reinforcing members having a first end and a second end and extending between the first end and the second end, and where the first end is connected to the suction side of the shell and the second end is connected to the pressure side of the shell thereby preventing deformation of the shell.

Various embodiments of reinforcing elements of the above mentioned kind has been proposed for the purpose of reinforcing wind turbine blades.

THE OBJECT OF THE INVENTION

On this background it is the purpose of the present invention to provide a wind turbine blade and a wind turbine with reinforcing elements being easier to mount to an existing wind turbine blade than the reinforcing elements according to prior art.

According to the present invention this is obtained by a wind turbine blade according to claim 1, allowing that the reinforcing members may be mounted. e.g. retro-fitted, from outside the aerodynamic profile.

In a preferred embodiment of the invention the first head on the rod is formed by a screw, further having a threaded shank extending through the first through hole and being screw connected with the first end of the rod.

Furthermore the second through hole may advantageously have a cross section being smaller than the cross section of the second end of the rod, and the cross section of the shank on the screw with the second head may be slightly smaller than the cross section of the second through hole, so that the second end of the rod may be adapted to rest against the inner surface of the aerodynamic profile.

The first and/or the second head may advantageously be adhered or glued to the outer surface of the shell.

In a further preferred embodiment the first and the second through holes are circular cylindrical and has a cross section that increases in the direction away from the internal space of the blade, and the first and the second head both has a complementary cross section that increases in the direction away from the internal space of the blade, so that the first and second heads fits snuggly with the cross section of the through holes.

In this relation the increasing cross section of the through holes and the heads may preferably be conical.

According to the invention a method of installing the elongated reinforcing members in a wind turbine blade according to one or more of the preceding claims is also provided, the method comprising the steps of:
providing the first and the second through hole in the suction and the pressure side of the shell at opposing positions at the shell;
inserting the rod through the first through hole so that the first head rests against outer surface of the shell;
positioning the second end of the rod in front of the second through hole;
screw connecting the screw with the second head to the second end of the rod.

THE DRAWING

Figure 2:
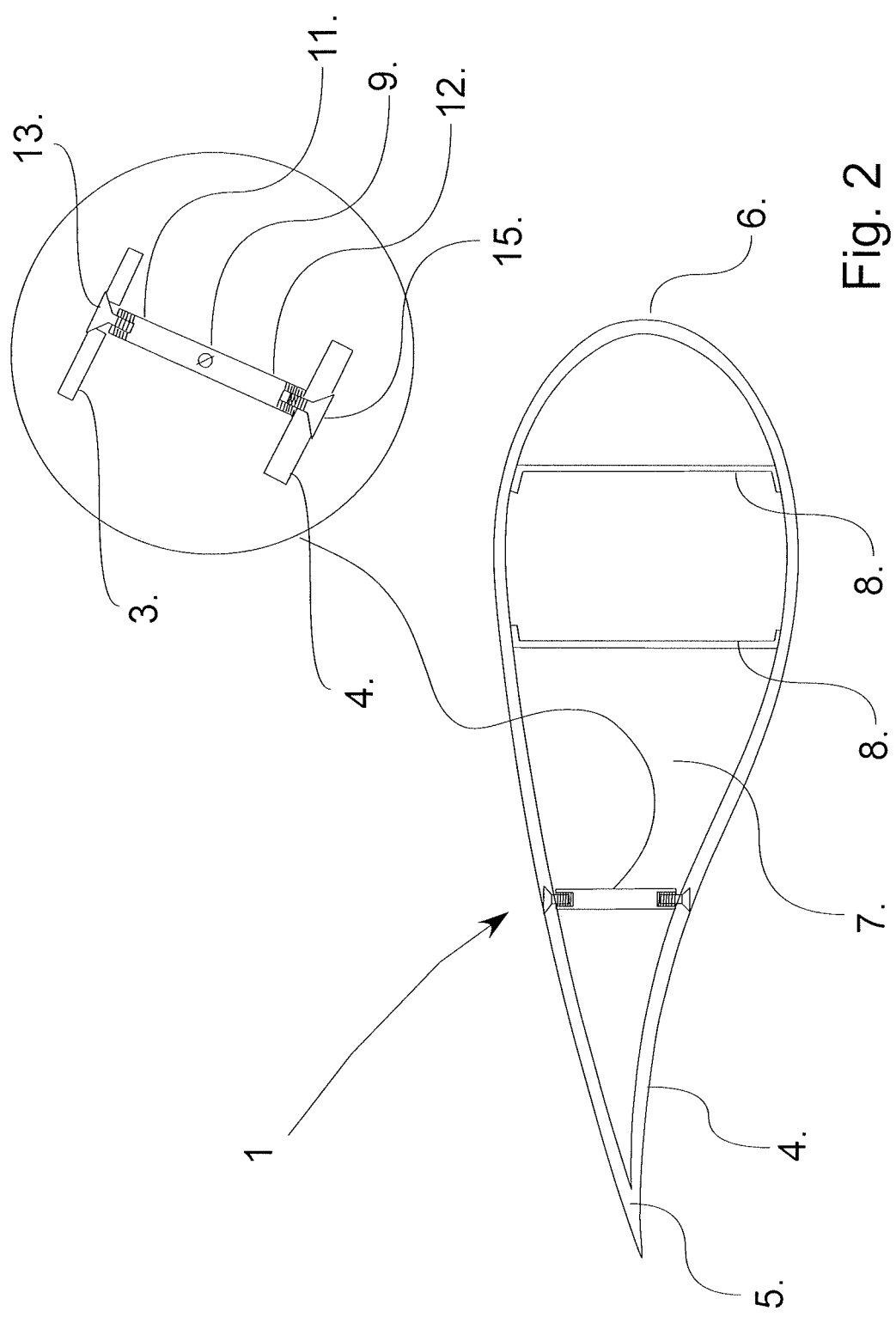

In the following one or more embodiments of the invention will be described in more detail and with reference to the drawing, where:
FIG. 1: Is a principle sketch, showing a cross section of a wind turbine blade according to the invention at a position where a reinforcing member is arranged, as well as an exploded view of a detail of the wind turbine blade, with the reinforcing member.
FIG. 2: Is a principle sketch, showing a cross section of the same wind turbine blade as shown in FIG. 1 at a position where a reinforcing member is arranged, as well as an increased view of a detail of the wind turbine blade, with the reinforcing member in an assembled state.

DESCRIPTION OF EXEMPLARY EMBODIMENTS

FIGS. 1 and 2 shows the same cross section through a wind turbine blade 1 having a shell 2 forming an aerodynamic profile with a suction side 3 and a pressure side 4 being separated by a trailing edge 5 and a leading edge 6 defined by the direction by which the wind turbine blade travels through space in the normal use of the blade.

The shell thereby encloses an internal space 7, and a number of girders 8 may, or may not, be arranged in the internal space for providing stiffness to the wind turbine blade.

In order to further reduce deformations on the shell 2 of the wind turbine blade 1, a reinforcing member is according to the invention mounted so that it extends between the suction side 3 and the pressure side 4 of the wind turbine blade 1.

According to the invention the reinforcing member comprises a rod 9 extending between the suction side 3 and the pressure side 4 of the wind turbine blade 1, and in the preferred embodiment a through hole 10 having a smallest cross section being larger than the largest cross section of the rod 9, so that the rod can be inserted into the internal space 7 through the through hole 10 as shown in the exploded view of the reinforcing member in FIG. 1.

In this embodiment a first end 11 rod 9 is attached to the suction side 3 by means of a first screw 13 having a conical screw head 14, and the second end 12 of the rod 9 is attached to the pressure side 4 by means of a second screw 15 having a second conical head 16 and extending through a second through hole 17 on the pressure side 4. As shown in the figures the second through hole 17 may have a smallest cross section being smaller than the cross section at the second end 12 of the rod 9, so that the second end 12 of the rod 9 rests against the inside of the shell 2 in the assembled state of the reinforcing member.

In the assembled state the first and second screws are preferably adhered or glued to the shell 2, so that the reinforcing member provides resistance against both compression and tension forces acting on the rod 9 due to deformations of the shell 2.

The present invention may be used in connection with reinforcing different embodiments of wind turbine blades, but it is especially advantageous in relation to reinforcing long and slender wind turbine blades,. In such wind turbine blades the reinforcing members according to the invention may be used at any place where reinforcement is required providing resistance against both compression and tension forces acting on the rod 9, but it is especially advantageous for mounting in the distal end of the wind turbine blade, where it is otherwise very difficult to access.

The invention claimed is:

1. A wind turbine blade, comprising:
    a shell with an aerodynamic profile forming an outer surface on a suction side and a pressure side of the blade respectively and an internal space in the blade, the suction side and the pressure side being separated by a leading edge and a trailing edge defined by the direction by which the blade moves through space during normal operation and a number of elongated reinforcing members connected to the shell for increasing the strength of the blade, each of the at least one elongated reinforcing members having a first end and a second end and extending between the first end and the second end,
    wherein
    one end is connected to the suction side of the shell and the other end is connected to the pressure side of the shell thereby preventing deformation of the shell, and
    at least some of the elongated reinforcing members are adapted for both resisting compression and tension forces,
    the reinforcing members includes
    a rod having a largest cross section between the first and the second end of the rod extends in the internal space and with its longitudinal direction between the suction side and the pressure side in the internal space, the shell has a first through hole on the suction or the pressure side of the blade, the first through hole having a smallest cross section being larger than the largest cross section of the rod,
    the rod has a first head arranged on the first end, the first head having a cross section being larger than the smallest cross section of the first through hole and is attached to the outer surface of the shell, and,
    the rod extends from the first head and into the internal space via the first through hole, and where the second end of the rod is attached to a second through hole in the shell by a screw having a second head resting against the outer surface of the shell, and a threaded shank extending through the second through hole in the shell and being screw connected with the second end of the rod,
    the first and the second through holes are circular cylindrical and has a cross section that increases in the direction away from the internal space of the blade, and the first and the second head both has a complementary cross section that increases in the direction away from the internal space of the blade, and,
    the second through hole has a cross section smaller than the cross section of the second end of the rod, and the cross section of the shank on the screw with the second head is slightly smaller than the cross section of the second through hole.

2. A wind turbine blade according to claim 1, wherein the first head on the rod is formed by a screw, further having a threaded shank extending through the first through hole and being screw connected with the first end of the rod.

3. A wind turbine blade according to claim 1, wherein the first head is adhered or glued to the outer surface of the shell.

4. A wind turbine blade according to claim 3, wherein the second head is adhered or glued to the outer surface of the shell.

5. A wind turbine according to claim 1, where the increasing cross section of the through holes and the heads are conical.

6. A method of installing the elongated reinforcing members in a wind turbine blade according to claim 1, the method comprising:
    providing the first and the second through hole in the suction and the pressure side of the shell at opposing positions at the shell;
    inserting the rod through the first through hole so that the first head rests against outer surface of the shell;
    positioning the second end of the rod in front of the second through hole; and
    connecting the screw with the second head to the second end of the rod.

* * * * *